United States Patent [19]

Mabuchi

[11] Patent Number: 4,542,166

[45] Date of Patent: Sep. 17, 1985

[54] STEERING WHEEL COMPOSED OF A NON-YELLOWING SEMI-RIGID POLYURETHANE FOAM

[75] Inventor: Akira Mabuchi, Nagoya, Japan

[73] Assignee: Toyoda Gosei Co., Ltd., Aichi, Japan

[21] Appl. No.: 693,307

[22] Filed: Jan. 23, 1985

Related U.S. Application Data

[63] Continuation of Ser. No. 589,222, Mar. 13, 1984, abandoned.

[30] Foreign Application Priority Data

Mar. 15, 1983 [JP] Japan .................................. 58-41577

[51] Int. Cl.$^4$ .............................................. C08G 18/14
[52] U.S. Cl. ..................................... 521/176; 74/552; 521/174
[58] Field of Search ............................... 521/174–176; 74/552

[56] References Cited

U.S. PATENT DOCUMENTS 4,230,823 10/1980 Alberts et al. ..................... 521/137
4,292,411 9/1981 Jourquin et al. ..................... 521/128

FOREIGN PATENT DOCUMENTS 53-7956   3/1978 Japan.
54-15599  6/1979 Japan.
55-3365   1/1980 Japan.
57-43167  9/1982 Japan.

*Primary Examiner*—Maurice J. Welsh
*Attorney, Agent, or Firm*—Cushman, Darby & Cushman

[57] ABSTRACT

A non-yellowing, semi-rigid polyurethane foam is disclosed. The foam is prepared by mixing the following components (a), (b), (c) and (d) with a blowing agent and a catalyst, and pouring the mixture into a mold where it is allowed to foam and cure.

(a) a polymer polyol having a molecular weight of 3,000 to 10,000 wherein a vinyl monomer is grafted to a polyether polyol;
(b) a polyol having a molecular weight of 62 to 300;
(c) an aliphatic or alicyclic isocyanate; and
(d) at least one ultraviolet absorber and at least one antioxidant.

5 Claims, No Drawings

STEERING WHEEL COMPOSED OF A NON-YELLOWING SEMI-RIGID POLYURETHANE FOAM

This is a continuation of application Ser. No. 589,222 filed Mar. 13, 1984 and now abandoned.

FIELD OF THE INVENTION

The present invention relates to a non-yellowing, semi-rigid polyurethane foam with a self-forming skin which in produced from an aliphatic isocyanate or alicyclic isocyanate. More specifically, the invention relates to a non-yellowing, semi-rigid polyurethane foam with a self-forming skin which is produced by the following process: (1) a polymer polyol prepared by grafting a vinyl monomer to a polyether polyol is reacted with an aliphatic isocyanate or alicyclic isocyanate in the presence of a polyol having a molecular weight of 62 to 300, an ultraviolet absorber, an antioxidant, a catalyst and a blowing agent, (2) the reaction mixture is poured into a closed mold, and (3) the poured mixture is allowed to foam and cure in the mold.

BACKGROUND OF THE INVENTION

Semi-rigid polyurethane foams with a self-forming skin are generally called integral skin foams. Because of their flexibility and good touch, integral skin foams are extensively used in steering wheels and interior automotive trims such as arm rests and crash pads. With the recent trend for using larger windshields and windows in automobiles, greater light-stability is, more than even before, now required for interior automotive trims. This is all the more true because many different colors have come to be used in the trims and they are often pale in tone.

However, the semi-rigid integral foams made from aromatic isocyanates which are currently used in interior automotive trims yellow upon exposure to sunlight, particularly ultraviolet radiation, and depending on the color of the trims, the yellowing is so conspicuous that it reduces the aesthetic appeal of the trims. A plausible reason for this phenomenon is that the aromatic ring in the chemical structure of the foam changes to a quinoid as shown below:

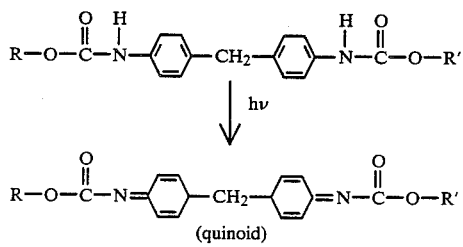
(quinoid)

One method which has been proposed for solving this problem is the in-mold coating process wherein a urethane elastomer made of an aliphatic isocyanate or alicyclic isocyanate is dissolved in a solvent; a coat of the solution is applied onto the inner wall of a mold with a spray gun; and a semi-rigid urethane is poured into the mold. However, because of the additional steps of applying and drying the mold coat, the in-mold coating process has a longer molding cycle. Furthermore, in order to provide a coat of a thickness of about 50 microns that is not necessary for ensuring sufficient light stability, repeated coatings must be conducted and this leads unavoidably to a prolonged time for coating and drying. As another disadvantage, it is difficult to form a uniform thickness of coat on the inner wall of a mold having a complicated shape.

The commonest way to prevent the photo-degradation of semi-rigid integral forms is by the addition of ultraviolet absorbers and antioxidants. This method is effective in preventing the occurrence of cracks in the foam but is not highly effective in preventing the discoloration of the foam. A method has been proposed for preventing both yellowing and cracking by using a urethane foam made from an aliphatic or alicyclic isocyanate wherein the NCO group of the isocyanate is not directly bonded to the aromatic group. According to Japanese Patent Publications Nos. 7956/78 and 3365/80, a non-yellowing urethane foam is prepared by using a mixture of aliphatic and aromatic polyisocyanates. However, the urethane foam incorporating the aromatic isocyanate cannot be completely protected from yellowing.

Japanese Patent Publication No. 15599/79 shows formulations wherein various aliphatic and alicyclic isocyanates are combined with a polyether polyol, a crosslinking agent, an organometallic catalyst and an antioxidant. The antioxidant is indispensable for preventing the melting of the urethane foam upon exposure to ultraviolet radiation, but the amount of the antioxidant incorporated in these formulations is about 3.4 wt% which is unusually greater than the conventional amount. Therefore, the antioxidant may bleed in the foam or otherwise deteriorate its properties.

Japanese Patent Publication No. 43167/82 describes a formulation wherein a hexafunctional polyether polyol and diethanolamine are used as crosslinking agents, together with isophorone diisocyanate, hydrogenated, 4,4'-diphenylmethane diisocyanate, an ultraviolet absorber and an antioxidant. However, because of the presence of the hexafunctional polyether polyol, this formulation is not expected to have good elongation. In addition, the amounts of the ultraviolet absorber and the antioxidant used therein are as high as about 3% by weight.

The problem common to these prior art techniques is that the melting of the foam prepared from aliphatic and alicyclic isocyanates due to ultraviolet radiation cannot be completely prevented unless large quantities of an ultraviolet absorber and an antioxidant are incorporated.

SUMMARY OF THE INVENTION

The present inventors made extensive studies to solve this problem and have found that polyurethane foam formulation that experiences minimum discoloration and melting can be obtained by using a polymer polyol made by grafting to a polyether polyol a vinyl monomer such as styrene, methyl methacrylate or vinyl chloride monomer. The present invention provides a polyurethane foam having such characteristics.

DETAILED DESCRIPTION OF THE INVENTION

The present invention provides a non-yellowing, semi-rigid polyurethane foam prepared by mixing the following components with a blowing agent and a catalyst, and pouring the mixture into a mold where it is allowed to foam and cure:

(a) a polymer polyol having a molecular weight of 3,000 to 10,000 wherein a vinyl monomer is grafted to a polyether polyol;

(b) a polyol having a molecular weight of 62 to 300;

(c) an aliphatic or alicyclic isocyanate; and (d) at least one ultraviolet absorber and at least one antioxidant.

Examples of the polymer polyol as component (a) are listed in Journal of Cellular Plastics, March 1966 and include polymer polyols prepared by grafting onto polyether polyols vinyl monomers such as styrene, acrylonitrile, vinyl chloride and methyl methacrylate. In order to minimize possible discoloration, it is preferred that acrylonitrile be grafted to the polymer polyol not independently but together with another vinyl monomer such as styrene. If a polyurethane foam which is supposed to be provided with a bright color a pale color is desired, a white polymer polyol prepared by grafting styrene or methyl methacrylate to the polyether polyol is preferred. To the extent that the object of the present invention can be attained, the polymer polyol (a) may be mixed with a polyether polyol or polyester polyol with a molecular weight of 3,000 to 7,000 wherein an alkylene oxide is added to glycerine, trimethylolpropane or glycol.

Examples of the polyol as component (b) having a molecular weight of 62 to 300 include glycols such as ethylene glycol, 1,3-propanediol, propylene glycol, 1,4-butanediol, 1,2-butanediol, 1,3-butanediol, 1,5-pentanediol, 1,6-hexanediol, diethylene glycol and dipropylene glycol; aminoalcohols such as monoethanolamine, diethanolamine and triethanolamine; bishydroxyethoxybenzene; aromatic glycols such as addition products of bisphenol A and alkylene oxides; and addition products of sorbitol or sucrose and alkylene oxides.

Examples of the aliphatic isocyanate as component (c) are hexamethylene diisocyanate and 2,2,4-trimethylhexamethylene diisocyanate. Examples of the alicyclic isocyanate as component (c) include 3-isocyanatomethyl-3,5,5-trimethylcyclohexyl isocyanate (isophorone diisocyanate), 4,4'-methylenebiscyclohexyl isocyanate and hydrogenated xylene diisocyanate.

Examples of the ultraviolet absorber as one part of the component (d) include benzotriazoles such as Tinuvin P, Tinuvin 327 and Tinuvin 328 (all being produced by Ciba-Geigy Corporation): benzophenones such as Tomisope 800 (product by Yoshitomi Pharmaceutical Industries, Ltd.); and hindered amines such as Sanol LS-770, Sanol LS-744 and Tinuvin 144 (all being produced by Ciba-Geigy Corporation).

Examples the antioxidant, the other part of the component (d), include hindered phenols such as Irganox 1010, Irganox 1076 (these are produced by Ciba-Geigy Corporation) and Sumilizer BHT of Sumitomo Chemical Co., Ltd.; phosphites such as triphenyl phosphite, trioctadecyl phosphite and tridecyl phosphite; and thioethers such as dilauryl thiodipropionate and distearyl thiodipropionate.

A suitable blowing agent may be selected from among many compounds that are conventionally used in the manufacture of polyurethane foams. Typical examples include trichloromonofluoromethane (R-11), trichlorotrifluoroethane (R-113), methylene chloride, and water.

Illustrative catalysts include trialkylamines such as triethylamine and tributylamine; alkanolamines such as N,N-dimethylethanolamine, N-methyldiethanolamine and triethanolamine; and polyamines such as tetramethylethylenediamine and pentamethyldiethylenetriamine. Other suitable catalysts are organometallic compounds such as dibutyltin dilaurate, stannous oleate, cobalt naphthenate and lead naphthenate. The amine catalysts may be used in admixture with the organometallic ompounds.

The advantages of the present invention will become apparent by reading the following working examples and comparative examples.

Blend samples having the formulations indicated below were charged into flattened molds (355 mm × 100 mm × 5 mm) to give a density of 0.70 g/cm$^3$. The mold temperature was 50° C. After curing for 10 minutes, the samples were taken out of the molds, left to stand at room temperature for 3 days and subjected to a light-stability test. The test pieces were also checked for their density, tensile strength and elongation.

1. Light-stability Test

Tester: long-life fadeometer manufactured by Suga Test Instrument Co., Ltd.

Black panel's temperature: 83±3° C.

Irradiation time: 400 hours

Instrument for the measurement of color difference ($\Delta E^*$): color analyzer Model 607 of Hitachi, Ltd.

Foam melting: The sample was rated o when no foam melting was found by visual inspection, $\Delta$ when some melting was detected, and $\times$ when melting was observed.

2. Measurement of Density, Tensile Strength and Elongation

The methods specified in JIS K-6301 were used.

The results of the light-stability test and the measurements of the density, tensile strength and elongation of each sample are shown in the table at the end of this specification.

In the list of formulations given in Examples 1 to 7 and Comparative Examples 1 to 5, some compounds are indicated by their simplified names or by acronyms, so details of these compounds are shown below.

Polymer polyol (1): Exenol 945, styrene-grafted type polymer polyol of Asahi Glass Company, Ltd. with a hydroxyl value of 28

Polymer polyol (2): Exenol 940, styrene-acryl grafted type polymer polyol of Asahi Glass Company, Ltd. with a hydroxyl value of 27.7

Polymer polyol (3): POP 31-28, acryl-grafted type polymer polyol of Mitsui-Nisso Urethane Co., Ltd., with a hydroxyl value of 28.0

UV absorber compound: a paste mixture (30 wt% solids content) prepared by dispersing 10 parts by weight each of Sanol LS-770 (Ciba-Geigy Corporation), Tinuvin P (Ciba-Geigy Corporation) and Irganox 1010 (Ciba-Geigy Corporation) in 70 part by weight of polyether polyol (triol, molecular weight 5,000)

HDI: hexamethylenediisocyanate

IPDI: 3-isocyanatomethyl-3,5,5-trimethylcyclohexylisocyanate (isophorone diisocyanate)

HXDI: hydrogenated xylenediisocyanate P0 HMDI: 4,4'-methylenebiscyclohexyl isocyanate

EXAMPLE 1

| | |
|---|---|
| Polymer polyol (1) | 100 (parts by weight) |
| 1,4-Butanediol | 10 |
| Dibutyltin dilaurate | 1 |
| UV Absorber compound | 0.5 |

-continued

| | |
|---|---|
| Freon-11 | 15 |
| HDI prepolymer (20.0% NCO) | 61 |

EXAMPLE 2

| | |
|---|---|
| Polymer polyol (1) | 100 (parts by weight) |
| 1,4-Butanediol | 10 |
| Dibutyltin dilaurate | 1 |
| UV Absorber compound | 0.5 |
| Freon-11 | 15 |
| IPDI prepolymer (16.0% NCO) | 76 |

EXAMPLE 3

| | |
|---|---|
| Polymer polyol (1) | 100 (parts by weight) |
| 1,4-Butanediol | 10 |
| Dibutyltin dilaurate | 1 |
| UV Absorber compound | 0.5 |
| Freon-11 | 15 |
| HXDI prepolymer (17.0% NCO) | 72 |

EXAMPLE 4

| | |
|---|---|
| Polymer polyol (1) | 100 (parts by weight) |
| 1,4-Butanediol | 10 |
| Dibutyltin dilaurate | 1 |
| UV Absorber compound | 0.5 |
| Freon-11 | 15 |
| HMDI prepolymer (13.5% NCO) | 90 |

EXAMPLE 5

| | |
|---|---|
| Polymer polyol (2) | 100 (parts by weight) |
| Ethylene glycol | 6.9 |
| Stannous oleate | 1 |
| UV Absorber compound | 0.5 |
| Freon-11 | 15 |
| HDI prepolymer (20.0% NCO) | 61 |

EXAMPLE 6

| | |
|---|---|
| Polymer polyol (2) | 50 (parts by weight) |
| polyether polyol (triol, m.w. 3,000) | 50 |
| 1,4-Butanediol | 10 |
| Dibutyltin dilaurate | 1 |
| UV Absorber compound | 0.5 |
| Freon-11 | 15 |
| HDI prepolymer (20% NCO) | 65.5 |

EXAMPLE 7

| | |
|---|---|
| Polymer polyol (3) | 100 (parts by weight) |
| 1,4-Butanediol | 10 |
| Dibutyltin dilaurate | 1 |
| UV Absorber compound | 0.5 |
| Freon-11 | 15 |
| HDI prepolymer (20% NCO) | 61 |

COMPARATIVE EXAMPLE 1

| | |
|---|---|
| Polyether polyol (triol, m.w. 3,000) | 100 (parts by weight) |
| 1,4-Butanediol | 10 |
| Dibutyltin dilaurate | 1 |
| UV Absorber compound | 0.5 |
| Freon-11 | 15 |
| HDI prepolymer (20.0% NCO) | 71 |

COMPARATIVE EXAMPLE 2

| | |
|---|---|
| Polyether polyol (triol, m.w. 5,000) | 100 (parts by weight) |
| Ethylene glycol | 6.9 |
| Dibutyltin dilaurate | 1 |
| UV Absorber compound | 0.5 |
| Freon-11 | 15 |
| HDI prepolymer (20.0% NCO) | 62 |

COMPARATIVE EXAMPLE 3

| | |
|---|---|
| Polymer polyol (1) | 100 (parts by weight) |
| 1,4-Butanediol | 10 |
| Dibutyltin dilaurate | 1 |
| Freon-11 | 15 |
| HDI prepolymer (20% NCO) | 61 |

COMPARATIVE EXAMPLE 4

| | |
|---|---|
| Polymer polyol (2) | 100 (parts by weight) |
| 1,4-Butanediol | 10 |
| Dibutyltin dilaurate | 1 |
| Freon-11 | 15 |
| HDI prepolymer (20% NCO) | 61 |

COMPARATIVE EXAMPLE 5

| | |
|---|---|
| Polymer polyol (3) | 100 (parts by weight) |
| 1,4-Butanediol | 10 |
| Dibutyltin dilaurate | 1 |
| Freon-11 | 15 |
| HDI prepolymer (20% NCO) | 61 |

TABLE

| | | Examples | | | | | | | Comparative Examples | | | | |
|---|---|---|---|---|---|---|---|---|---|---|---|---|---|
| | | 1 | 2 | 3 | 4 | 5 | 6 | 7 | 1 | 2 | 3 | 4 | 5 |
| Light-stability | Discoloration ($\Delta E^*$) | 2.2 | 3.5 | 2.6 | 2.9 | 2.3 | 6.6 | 21.3 | 22.2 | 21.3 | 39.8 | 38.7 | 49.5 |
| | Melting | o | o | o | o | o | o | o | x | x | o | o | o |
| Density (g/cm$^3$) | | 0.70 | 0.70 | 0.70 | 0.70 | 0.70 | 0.70 | 0.70 | 0.70 | 0.70 | 0.70 | 0.70 | 0.70 |
| Tensile strength (kg/cm$^2$) | | 12.7 | 19.8 | 16.2 | 12.0 | 14.2 | 18.3 | 13.3 | 6.5 | 7.2 | 12.8 | 14.1 | 13.5 |
| Elongation (%) | | 90 | 190 | 65 | 180 | 100 | 74 | 85 | 40 | 40 | 90 | 100 | 90 |

As the above table shows, the present invention provides a non-yellowing, semi-rigid polyurethane foam having excellent properties.

While the invention has been described in detail and with reference to specific embodiment thereof, it will be apparent to one skilled in the art that various changes and modifications can be made therein without departing from the spirit and scope thereof.

What is claimed is:

1. A steering wheel composed of a non-yellowing, semi-rigid polyurethane foam prepared by mixing the following components with a blowing agent and a catalyst, and pouring the mixture into a mold where it is allowed to foam and cure;
   (a) a polymer polyol having a molecular weight of 3,000 to 10,000 wherein a vinyl monomer is grafted to a polyether polyol;
   (b) a polyol having a molecular weight of 62 to 300;
   (c) an aliphatic or alicyclic isocyanate; and
   (d) at least one ultraviolet absorber and at least one antioxidant.

2. A steering wheel composed of the polyurethane foam of claim 1 in which the vinyl monomer grafted to the polyether polyol is at least one of styrene, acrylonitrile, vinyl chloride or methyl methacrylate.

3. A steering wheel composed of the polyurethane foam of claim 2 in which styrene is the vinyl monomer grafted to the polyether polyol.

4. A steering wheel composed of the polyurethane foam of claim 2 in which styrene and acrylonitrile are grafted to the polyether polyol.

5. A steering wheel composed of the polyurethane foam of claim 2 in which acrylonitrile is grafted to the polyether polyol.

* * * * *